(12) United States Patent
Adamic et al.

(10) Patent No.: US 6,419,353 B1
(45) Date of Patent: Jul. 16, 2002

(54) MAGENTA INK FORMULATION

(75) Inventors: Raymond J Adamic; Hiang P Lauw, both of Corvallis, OR (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/798,703

(22) Filed: Mar. 2, 2001

(51) Int. Cl.7 .................................................. G01D 11/00
(52) U.S. Cl. ............................ 347/100; 347/96; 347/95
(58) Field of Search ........................... 347/100, 96, 95; 106/31–58

(56) References Cited

U.S. PATENT DOCUMENTS

| | | |
|---|---|---|
| 4,210,582 A | 7/1980 | de Montmollin et al. |
| 4,818,285 A | 4/1989 | Causley et al. |
| 5,118,350 A | 6/1992 | Prasad |
| 5,185,034 A | 2/1993 | Webb et al. |
| 5,679,141 A | 10/1997 | McInerney et al. |
| 5,792,249 A * | 8/1998 | Shirota et al. ............... 347/100 |
| 5,851,273 A | 12/1998 | Morris et al. |
| 5,858,075 A | 1/1999 | Deardurff et al. |
| 6,045,607 A | 4/2000 | Brenton et al. |
| 6,120,589 A * | 9/2000 | Bannai et al. ........... 106/31.58 |
| 6,197,071 B1 * | 3/2001 | Diehl et al. .................... 8/409 |

FOREIGN PATENT DOCUMENTS

| | | | | |
|---|---|---|---|---|
| JP | 07179784 | * | 7/1995 | ........... C09B/67/22 |
| WO | WO 99/01510 | * | 1/1999 | ........... C09B/43/16 |

* cited by examiner

Primary Examiner—John Barlow
Assistant Examiner—Manish Shah

(57) ABSTRACT

Various ink formulations utilizing particular magenta dyes have excellent printing characteristics with high chroma and good lightfastness on plain paper and minimal humid bleed and hue shift on special media. The magenta humid bleed shift has been greatly reduced, especially on photo glossy materials. A single dye may be used in comparison to blended dyes which have been used in the past.

20 Claims, No Drawings

MAGENTA INK FORMULATION

FIELD OF THE INVENTION

The invention relates generally to inks for ink-jet printing, and, in particular, to a specific magenta inkjet ink formulations having high plain paper chroma, sufficient lightfastness and having little or no humid bleed/hue shift and associated dye sets.

BACKGROUND OF THE INVENTION

Ink-jet printing is a system in which ink droplets are formed by ink ejection methods of various types, such as system utilizing electrostatic attraction, systems wherein mechanical vibration or displacement is imparted to the ink by a piezoelectric device, and systems in which ink is heated to cause it to bubble and pressure produced when it bubbles, causing the ink to adhere to a printing mediums such as paper.

Ink compositions used in such ink-jet printing systems are typically prepared by dissolving or dispersing water-soluble dyes or pigments of various types in water or mixed solvents of water and water-soluble organic solvents are known and put into use. Such ink compositions have various performances generally suited for their particular use. For example, inks should not suffer from humid bleed (i.e., they should not result in a mutual color mixture of different colors at the respective boundary areas under humid conditions) or hue shift, but should still retain high plain paper chroma.

Various high quality ink-jet inks are commercially available and attempts have been made to balance these two ideals. Unfortunately, however, in order to balance the desired high chroma on plain paper and lightfastness on special media with magenta inks, magenta inks have been formulated to contain a combination of dyes. Such mixtures are relatively more difficult to produce, and the inherent characteristics of the particular dyes need to be addressed in formulating the remainder of the composition, thus occasionally unduly complicating the formulation.

As disclosed in International Application Number PCT/GB98/01853 to Zeneca Ltd (publication date Jan. 14, 1999, and designating the United States of America), the entire contents of which are incorporated by this reference, a monoazo dye useful for the production of inks has the formula:

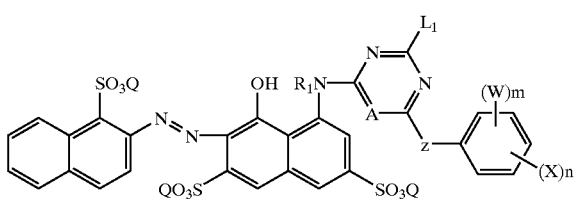

(I)

wherein

A is N, C—Cl, C—CN or C—NO$_2$;

L$^1$ is —OR$^2$;

Z is —O—, —S—, or —NH—;

R1 is H, alkyl, or a substituted alkyl;

each W is independently selected from the group consisting of —CO$_2$Q or SO$_3$Q;

each X is independently selected from the group consisting of an amino group, a substituted amino group, a group that is substituted by an optionally substituted amino group, halo, hydroxy, nitro, cyano, optionally substituted alkoxy, optionally substituted aryl, optionally substituted aralkyl, —SR$^a$, —COR$^a$, —COOR$^a$, —SO$_3$R$^a$, or —SOR$^a$;

R$^a$ is C$_{1-4}$alklyl, optionally substituted by carboxy, sulpho, hydroxy, nitro, halo, or cyano;

each Q is independently selected from ammonium, substituted ammonium, sodium, lithium, potassium, tetramethylammonium ion, and similar moieties;

m has a value of from zero (0) to three (3);

n has a value of from one (1) to three (3); and (m+n) has a value of from one (1) to five (5).

SUMMARY OF THE INVENTION

Surprisingly it has been found that by carefully selecting and choosing from the numerous moieties in formula I, and incorporating the selection into an ink formulation, a magenta ink-jet ink results which can be utilized as a single dye, which ink balances both high chroma on plain paper and lightfastness and humid bleed/hue shift on special media.

A magenta ink of the present invention comprises one or more magenta dyes, wherein one of the dyes has the formula of the herein described Formula II, wherein Formula II is the moieties of Formula (I) moieties wherein A is selected to be nitrogen, L$^1$ is OR$^2$, Z is —NH, R$^1$ is H, W is —SO$_3$Q, m is one, X is —CH$_3$, n is two, and the composition is denoted herein as "Formula (II)":

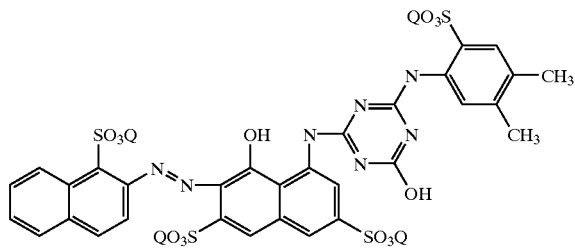

(II)

These magenta ink formulations have excellent printing characteristics with high chroma on plain paper and minimal humid bleed and lightfastness on special media. The magenta humid bleed shift has been greatly reduced, especially on photo glossy materials. A single dye may optionally be used in comparison to blended dyes which have been used in the past.

The present invention also provides an ink-jet printing process carried out by jetting an ink composition to a printing medium in the form of droplets to make a record, wherein the ink composition comprises a water-based magenta ink composition.

DETAILED DESCRIPTION OF THE INVENTION

The invention described herein is directed to a magenta ink particularly suitable for use in printing inkjet images using commercially available inkjet printers such as DESK-JET™ printers manufactured by Hewlett-Packard Company of Palo Alto, Calif.

As previously described, methods for making compositions such as (but not specifically including) the magenta dye used herein are described in International Application Number PCT/GB98/01853, wherein appropriate constituents are substituted for those described in the International Application as would be known by one of ordinary skill in the art of making azo dyes. For instance, a condensation reaction, performed in the presence of a base, is designed and performed between appropriately selected compounds (see, e.g., pages 5–7 of the previously incorporated International Application). After condensation, isolation may be accomplished by precipitating the product as a salt or a free acid by acidifying the reaction mixture. The resulting product may be converted to the ammonium or substituted ammonium salt by the addition of ammonia, ammonium hydroxide, primary, secondary, tertiary or quaternary amine.

The resulting dye preferably has a target absorbance of from about 0.06 to about 0.40 (peak absorbance value measured at 1:10,000 dilution (100 ppm) wt/wt for the individual dye in each ink), at a nominal lambda (max.) of from about 542 to about 548 nm. More preferably, the resulting dye has a target absorbance of from about 0.15 to about 0.17 (peak absorbance value measured at 1:10,000 dilution (100 ppm) wt/wt for the individual dye in each ink), at a nominal lambda (max.) of from about 542 to about 548 nm. Most preferably, the resulting dye has a target absorbance of 0.16 (peak absorbance value measured at 1:10,000 dilution (100 ppm) wt/wt for the individual dye in each ink), a nominal lambda (max.) of 545 nm, and a nominal dye load of 4.5 weight per cent.

The dye of Formula II is present in a salt form wherein the counterion can be a cation such as ammonium, substituted ammonium (e.g., tetramethylammonium or "TMA"), sodium, lithium, etc.

Salt forms of the dye, such as potassium, lithium, ammonium, and alkanolammonium, for example, may be readily prepared in known manner, by proceeding from the corresponding salts of the intermediates, or by conversion of the sodium salts of the dyes.

The aqueous medium used in the water-based magenta ink composition of the present invention is water, or a mixed solvent of water and a water-soluble organic solvent. Particularly preferably, it may be a mixed solvent of water and one or more water-soluble organic solvents. As the water, it is preferable to use not commonly available water containing various ions, but deionized water.

The water-soluble organic solvent(s) used as its mixture with water may include, for example, lower alcohols such as methyl alcohol, ethyl alcohol, n-propyl alcohol, isopropyl alcohol, n-butyl alcohol, sec-butyl alcohol and tert-butyl alcohol; amides such as dimethylformamide and dimethylacetamide; ketones or ketoalcohols such as acetone and diacetone alcohol; polyalkylene glycols such as polyethylene glycol and polypropylene glycol; alkylene glycols such as ethylene glycol, propylene glycol, butylene glycol, diethylene glycol, triethylene glycol, tetraethylene glycol, dipropylene glycol, tripropylene glycol, thiodiglycol and hexylene glycol; 1,5-pentanediol; glycerol; 2-pyrrolidone; N-methyl-2-pyrrolidone; and 1,3-dimethyl-2-imidazolidinone.

Surfactants suitably employed in the practice of the invention include anionic and nonionic surfactants. Examples of anionic surfactants include: Sulfonate surfactants such as Sulfosuccinates (Aerosol OT, A196; AY and GP, available from CYTEC) and Sulfonates (Aerosol DPOS-45, OS available from CYTEC; Witconate C-50H available from WITCO; Dowfax 8390 available from DOW); and Fluoro surfactants (Fluorad FC99C available from 3M). Examples of nonionic surfactants include: Fluoro surfactants (Fluorad FC170C available from 3M); Alkoxylate surfactants (Tergitol series 15S-5, 15S-7, and 15S-9 available from Union Carbide); and Organosilicone surfactants (Silwet L-77 and L-76-9 available from WITCO).

Buffers optionally employed in the practice of the invention to modulate pH can be organic-based biological buffers or inorganic buffers, preferably, organic-based. Examples of preferably-employed buffers include tris(hydroxymethyl) aminomethane (TRIS), available from companies such as Aldrich Chemical (Milwaukee, Wis.), 4-morpholineethanesulfonic acid (MES), 4-morpholinepropanesulfonic acid (MOPS), and beta-hydroxy-4-morpholinepropanesulfonic acid (MOPSO). Further, the buffers employed should provide a pH ranging from about 3 to about 9 in the practice of the invention, preferably about 4 to about 6 and most preferably from about 4 to about 5.

Any of the biocides commonly employed in inkjet inks may optionally be employed in the practice of the invention, such as Nuosept 95, available from Huls America (Piscataway, N.J.); Proxel GXL, available from Zeneca (Wilmington, Del.); and glutaraldehyde, available from Union Carbide Company (Bound Brook, N.J.) under the trade designation Ucarcide 250.

Inks according to the invention may optionally also include a metal chelator. Such chelators are used to bind transition metal cations that may be present in the ink. Examples of preferred metal chelators include: ethylenediaminetetraacetic acid ("EDTA"), diethylenediaminepentaacetic acid ("DPTA"), trans-1,2-diaminocyclohexanetetraacetic acid ("CDTA"), ethylenedinitrilotetraacetic acid ("EGTA"), or other chelators.

Inks according to the invention may also include light-fastness additives in appropriate amounts known to those of skill in the art.

Inks according to the invention will typically have a pH of from about 3.0 to about 5.0, preferably from about 3.5 to about 4.5.

The ink composition of the invention is suitable employed with any ink jet printer for any drop on demand ink jet technology. However, it is also useful in piezoelectric ink jet technology.

All concentrations given herein are parts by weight, unless usage indicates to the contrary. The purity of the components is preferably that employed in normal commercial practice for inkjet inks.

The invention is further explained by the use of the following illustrative example:

EXAMPLE

Compositions having the following formulations were made, as shown in Table I:

TABLE I

| Composition | Control | A | B |
|---|---|---|---|
| alkyl diol | 12 | 12 | 15 |
| 2-pyrrolidone | 6 | 5 | 2 |
| polyethylene glycol | 3.3 | 3.3 | 3.3 |
| octyl dimethyl glycine | 3.4 | 3.4 | 3.4 |
| sodium hexadecyl diphenyloxide disulfonate | 0.5 | 0.5 | 0.5 |

TABLE I-continued

| Composition | Control | A | B |
|---|---|---|---|
| oleyl triethoxy monodiphosphate | 0.4 | 0.4 | 0.4 |
| chelating agent | 0.1 | 0.1 | 0.1 |
| secondary alcohol ethoxylate | 0.7 | 0.7 | 0.7 |
| dicarboxylic acid | 5 | 5 | 5 |
| AR52 | Abs 0.16 @ 1:10000 | 0 | 0 |
| Formula II dye (Li salt) (Avecia, Inc. of Wilmington, DE). | 0 | Abs 0.151 @ 1:10000 | Abs .159 @ 1:10000 |
| pH | 4 | 4 | 4 |

The compositions A, B and Control of Table I were analyzed for plain paper chroma and humid bleed/hue shift. The humid hue shift was run for four days at 15° C. and 80% relative humidity and 0.35 OD grey. As shown in Table II, the compositions A and B exhibited excellent high plain paper chroma, with little or no humid bleed/hue shift (delta h) compared to the Control ink.

TABLE II

| | 4 day 35/80 hue shifts | | | | |
|---|---|---|---|---|---|
| | del a* | del b* | del L* | delta E | delta h (deg) |
| Composition A | 12.2 | −6.0 | −6.1 | 14.9 | −0.9 |
| Composition B | 10.4 | −4.8 | −5.3 | 12.6 | −0.3 |
| Composition C | 26.1 | −1.8 | −2.4 | 26.2 | 13.9 |

What is claimed is:

1. A magenta ink having high plain paper chroma and reduced humid bleed/hue shift, said magenta ink comprising:
   (a) a dye compound having formula (II):

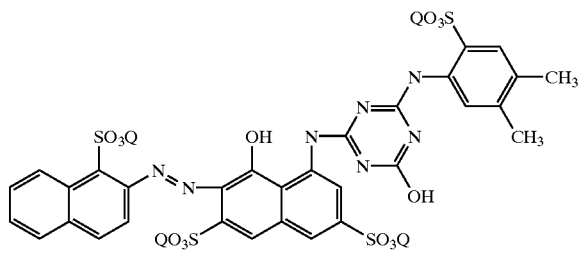

wherein Q is a cation; and
   (b) a medium comprising water or mixtures of water and an organic solvent.

2. The magenta ink of claim 1 wherein the medium comprises from 70 to 99.99 parts by weight of the magenta ink.

3. The magenta ink of claim 1 wherein the dye comprises from 0.01 to 30 parts by weight of the magenta ink.

4. The magenta ink of claim 1 further comprising at least one component independently selected from the group consisting of surfactants, buffers, biocides, metal chelators, and mixtures thereof.

5. The magenta ink of claim 1 wherein Q is independently selected from the group of cations consisting of ammonium, substituted ammonium, sodium, lithium, potassium, and tetramethylammonium ion.

6. The magenta ink of claim 1 wherein Q is sodium.

7. The magenta ink of claim 1 wherein Q is lithium.

8. The magenta ink of claim 1 wherein Q is ammonium.

9. The magenta ink of claim 1 wherein said magenta dye is the only dye in said ink.

10. The magenta ink of claim 1 wherein the magenta ink has a pH of from about 3 to about 5.

11. The magenta ink of claim 1 wherein the magenta ink has a pH of from about 3.5 to about 4.5.

12. The magenta ink of claim 1 further comprising a surfactant.

13. The magenta ink of claim 1 wherein the magenta dye has a visible light absorbance of from about 0.06 to about 0.40 at a lambda$_{max}$ of from 542 to 548 and at a 1:10,000 dilution in water.

14. The magenta ink of claim 1 wherein the magenta dye has a visible light absorbance of about 0.15 to 0.17 at a lambda$_{max}$ of about 544 and at a 1:10,000 dilution in water.

15. An ink set for ink-jet printing, said ink set comprising:
   at least one yellow ink containing at least one yellow dye;
   at least one cyan ink containing at least one cyan dye; and
   at least one magenta ink comprising
   (a) a dye compound having the formula:

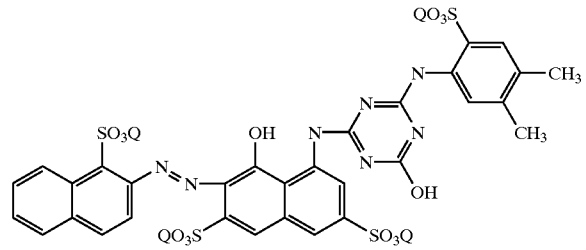

wherein Q is a cation; and
   (b) a medium comprising water or a mixture of water and an organic solvent.

16. The ink set of claim 15 further comprising at least one black ink containing at least one black dye.

17. The ink set of claim 15 wherein the magenta dye comprises from 0.01 to 30 parts by weight of the magenta ink.

18. The ink set of claim 15 wherein Q is independently selected from the group of cations consisting of ammonium, substituted ammonium, sodium, lithium, potassium, and tetramethylammonium ion.

19. The ink set of claim 15 wherein the magenta dye has a visible light absorbance of from about 0.06 to about 0.40 at a lambda$_{max}$ of from 542 to 548 and at a 1:10,000 dilution in water.

20. The ink set of claim 15 wherein the magenta dye has a visible light absorbance of about 0.15 to 0.17 at a lambda$_{max}$ of about 544 and at a 1:10,000 dilution in water.

* * * * *

UNITED STATES PATENT AND TRADEMARK OFFICE
CERTIFICATE OF CORRECTION

PATENT NO. : 6,419,353 B1
DATED : July 16, 2002
INVENTOR(S) : Adamic et al.

It is certified that error appears in the above-identified patent and that said Letters Patent is hereby corrected as shown below:

<u>Column 6,</u>
Line 21, delete "0.15to" and insert therefor -- 0.15 to --.

Signed and Sealed this

Fifteenth Day of June, 2004

JON W. DUDAS
*Acting Director of the United States Patent and Trademark Office*